W. LEINERT.
LIQUID WEIGHING DEVICE.
APPLICATION FILED APR. 26, 1913.

1,103,303.

Patented July 14, 1914.
2 SHEETS—SHEET 1.

WITNESSES:
M. A. Johnson
W. E. Morton

INVENTOR
Wenzel Leinert,
BY
Wm. H. Caufield
ATTORNEY

W. LEINERT.
LIQUID WEIGHING DEVICE.
APPLICATION FILED APR. 26, 1913.

1,103,303.

Patented July 14, 1914.
2 SHEETS—SHEET 2.

WITNESSES:
M. A. Johnson
W. E. Morton

INVENTOR
Wenzel Leinert,
BY
Wm. N. Caufield,
ATTORNEY.

UNITED STATES PATENT OFFICE.

WENZEL LEINERT, OF NEW YORK, N. Y.

LIQUID-WEIGHING DEVICE.

1,103,303.  Specification of Letters Patent.  Patented July 14, 1914.

Application filed April 26, 1913. Serial No. 763,697.

*To all whom it may concern:*

Be it known that I, WENZEL LEINERT, a subject of the Czar of Russia, residing at New York, in the county of New York and State of New York, have invented certain new and useful Improvements in Liquid-Weighing Devices; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a device for measuring liquids, and consists of a pair of tilting tanks which are normally held level by counterweights, but which independently tilt when liquid deposited in them reaches a certain weight, the tanks having means for withdrawing the liquid when the tilting takes place.

The invention relates to a weigher of this type which is accurate, due to an improved regulating means on the inlet pipe for alternately directing the liquid into one tank and then the other, the directing means being operated by the tanks alternately as they tilt. The regulating means is fixed and has fixed outlets, the directing of the liquid being due to an interior construction of a valve to which the outlets are connected.

A further object of the invention is the provision of a regulating means which provides for a maximum flow when the liquid is first directed into the tank, and for a slower flow or one with less volume as the tank becomes fuller.

The invention is illustrated in the accompanying drawings, in which—

Figure 1:
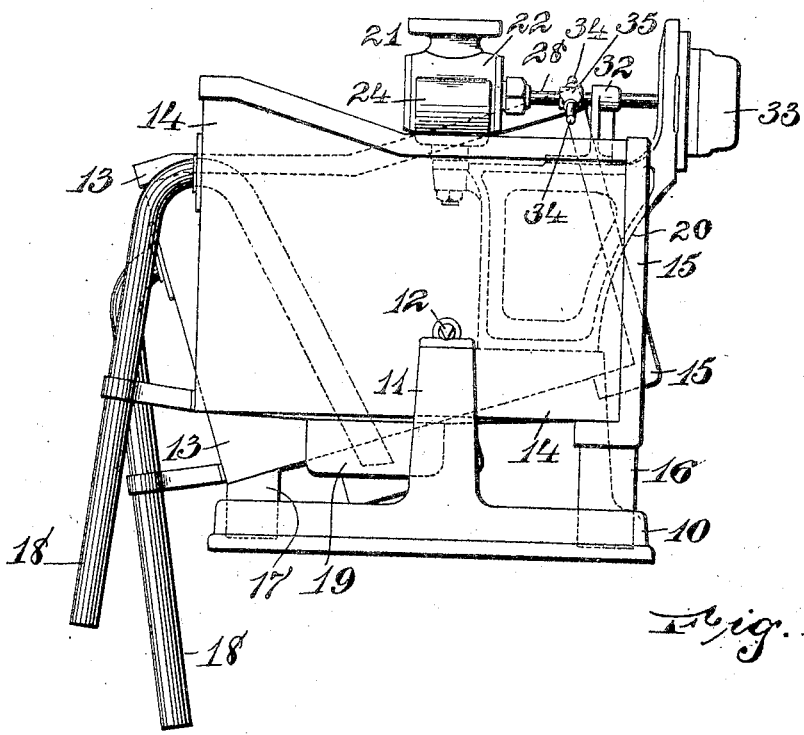
Figure 2:
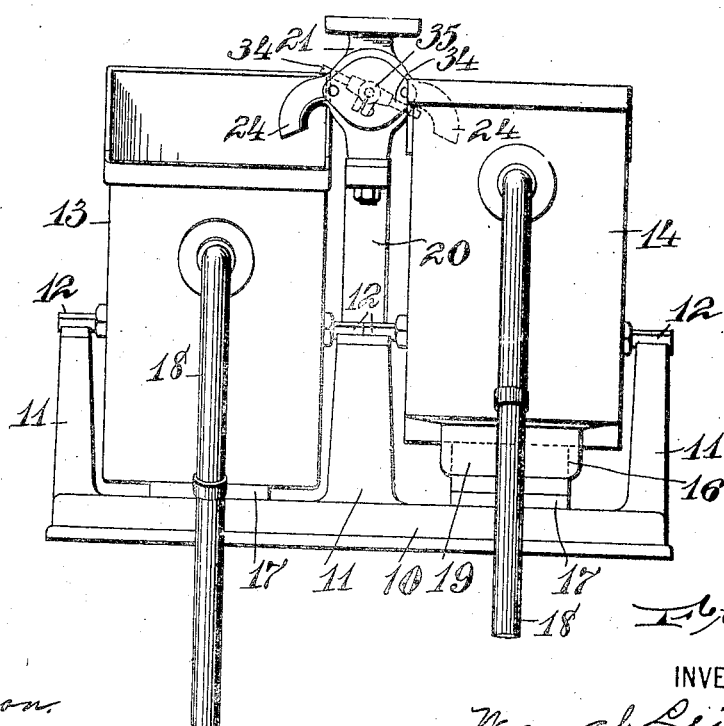
Figure 3:
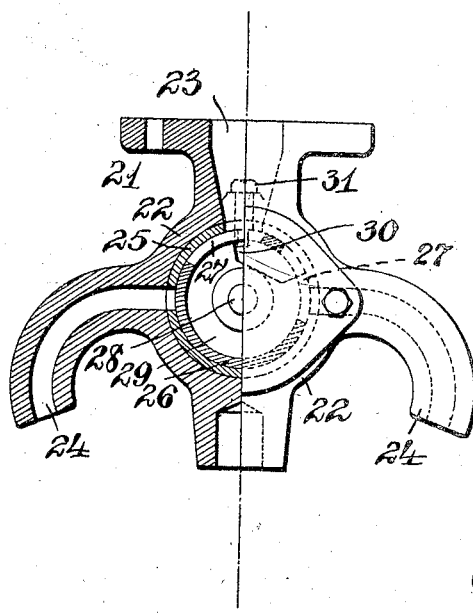
Figure 4:
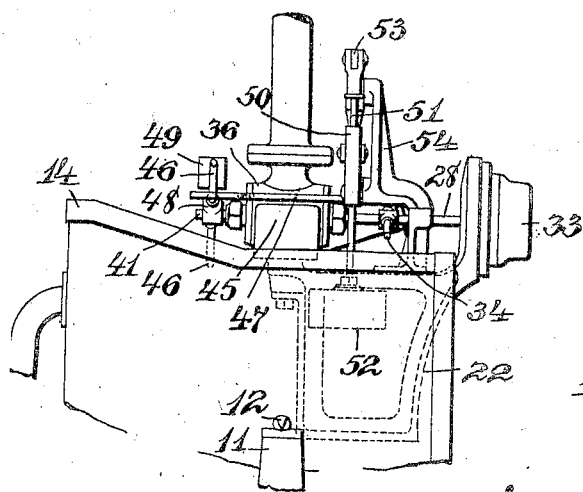
Figure 5:
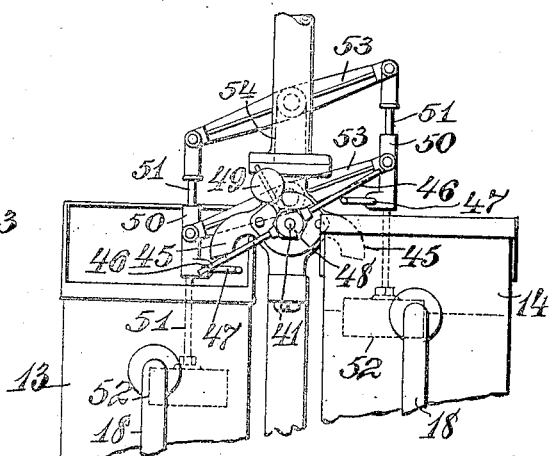

Figure 1 is a side view of the improved liquid measuring device. Fig. 2 is a front view of the device shown in Fig. 1. Fig. 3 is a view showing one-half in section and one-half in elevation of the valve used in the construction shown in Fig. 1. Fig. 4 is a side view of the top portion of the measuring device of a modified form. Fig. 5 is a front view of the apparatus shown in Fig. 4, and Fig. 6 is a sectional view of the valve used in the construction shown in Figs. 4 and 5.

Any suitable frame is employed having a base 10 and standards 11 on which are mounted the knife-edges 12 of the tanks 13 and 14. The tanks are adapted to swing on the knife-edges and are mounted so that they swing independently. The tanks have counterweights 15, the counterweights being adapted to hold them in their normal positions, that is, the weights hold the tanks from tilting when they are empty. The tank on the right in Fig. 2 is shown in its normal position, and it will be seen from Fig. 1 that it is resting on the rear stop 16. The tank 13 is tilted and rests on the front stop 17. The knife-edges are so placed on the tanks that the tank normally rests in a horizontal or even position, but when liquid is poured into the tank, when it arrives at a certain height, the tank is tilted by reason of this weight overcoming the counterweight 15, and the tank when tilted is emptied by the siphon pipe 18 which projects from its front and extends within the tank, preferably in the depressed portion 19, whereby the tank is emptied even after the weight of the liquid in it has been reduced and the tank again becomes horizontal. The middle standard 11 has a frame 20 mounted thereon. On the front end of the frame 20 is a valve 21 which is shown more in detail in Fig. 3. The valve 21 has a casing, the top of the casing having an inlet 23 adapted to be connected to a suitable inlet pipe which is not shown in the drawings. The valve casing is provided with spouts 24 which are fixed when the casing is in place so that there is no tilting of the spouts and the direction and force of the liquid are not varied through any difference in its angle or in the angle of flow of the liquid.

The casing is provided with a suitable lining 25, and within the lining is arranged a valve ring 26 which is cut away as at 27 so that the solid portion of the ring extends sufficiently to shut off the liquid from the spouts alternately when the ring is swung or partly turned by the rod 28 which projects from the back of the valve. The end wall 29 is cut away at 30 to receive a stop-bolt 31, the stop-bolt thus limiting the swing of the valve ring 26. The rod 28 extends through the bracket 32 shown in Fig. 1 and is connected to a suitable counter 33 which records the number of tilts to which the rod is subjected, and thus records the amount of liquid that is passed through the weigher. The rod 28 is rocked by the pins 34 which project from opposite sides of the rod 28 and are secured thereto by a suitable clamp 35. It will thus be seen that when the liquid is flowing from the inlet pipe through one of the fixed spouts it will fill a tank, and when the tank tilts, the back edge of the tank engages the pin 34 on that side, the pin normally being clear of the edge of the tank so that the tank is in motion before it engages the pin and thus is not retarded in its action. The tank by this engagement with the pin rocks the rod 28, the valve ring 26 is turned with it, and the liquid is shut off from the tilted tank and is directed into the tank on the opposite side which in turn becomes filled while the tank that is tilted is being emptied through its siphon pipe 18.

Figure 6:
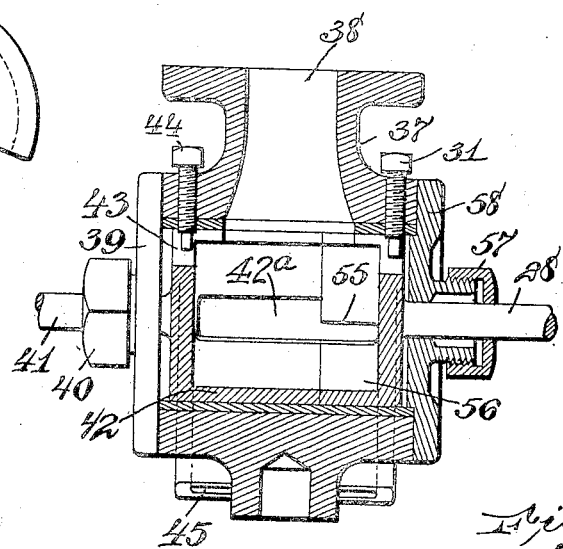

In Figs. 4, 5 and 6 I show a modified form in which a supplemental regulating attachment is supplied to a modified form of valve which has for its object to permit a maximum flow into a tank when it is first being filled and to provide for a slight flow in the tank when it is nearly full. This is designed to make the weigher more accurate, since when it is shut off there is a smaller amount of water between the outlet of the valve and the shut-off portion at the inside of the casing when the tilting occurs. The tanks in this construction are as described above, but the valve 36 is of a modified form of construction which is shown in section in Fig. 6. The valve has a casing 37 with an inlet 38, and at one end it is provided with a cap 39 having a stuffing box 40 through which projects a rod 41 on which is secured a valve ring 42 which is cut away at 43 to have the side edges of the cut away portion engage a stop-bolt 44 to limit the turning of the valve ring. The valve ring 42 has an opening 42ª on each side. The valve ring is adapted to shut off alternately the major portion of the inner end of the outlet of the spouts 45, that is, the spout is shut off by the ring 42 for the major portion of its intake end. This shut-off takes place by means of arms 46 which are engaged alternately by arms 47, the arms 46 being fastened to a suitable boss 48 and provided with a weight 49 which completes the swinging of the rod 41 when the weight 49 goes over the center. The arms 47 are bent to clear the spouts 45 and are fastened to the sleeves 50, the sleeves 50 being mounted on the stems 51, the stems 51 being provided with floats 52 at their lower ends, the stems also being attached to the rocking arms 53, the rocking arms being mounted on the bracket 54 and being adapted to hold the stems vertical. It will thus be seen that when the liquid in a tank rises up to a certain point, the float 52, through its stem and its arm 47, lifts an arm 46 on that side of the valve until the weight 49 goes over the center, when the weight then carries the valve ring 26 to a closed position so that the major portion of the liquid is shut off from the tank. The liquid, however, still flows through a small opening 55 which can be shut off by the valve ring 56 fastened to the rod 28 passing through the stuffing-box 57 of the cap 58 and being limited in its movement by the stop-bolt 31. The rod 28 in this instance is operated as described in Figs. 1 and 2, this operation taking place when a filled tank is tilted, whereby when the supply is entirely cut off there is a relatively small amount of liquid being fed to the tank when it tilts.

This invention is simple in its operation and is positive, and it is an improvement which provides for a more accurate weighing of the liquid by reason of the graduated amounts that are fed to the tanks in their filling, and also by reason of the fixed casing and the outlets which provide for positive opening and shutting of the valve.

Having thus described my invention, what I claim is:—

1. A liquid weigher consisting of a pair of tilting tanks, the tanks being unbalanced and having means for emptying them when they are tilted, a valve casing having spouts extending to both tanks, a rocking rod extending from the valve casing, arms on the rod and in the path of the tanks when they tilt, and a valve mechanism in the casing and acting to alternately close the spouts as the rod is rocked.

2. A liquid weigher consisting of a pair of tilting tanks, the tanks being unbalanced and having means for emptying them when they are tilted, a valve casing mounted above the space between the tanks, a pair of spouts projecting from the sides of the casing, means in the casing for alternately shutting off the spout, the casing having an inlet, a rocking rod connected to the last-mentioned means, and arms projecting from the rod and in the path of the tilting tanks.

3. A liquid weigher consisting of a pair of tilting tanks, the tanks being unbalanced and having means for emptying them when they are tilted, a valve casing having oppositely projecting spouts, means in the casing for shutting off each spout alternately, said means consisting of a shut-off for the major portion and a shut-off for the less portion of the spout, floats suspended in each tank, means connecting each float with the shut-off for the major portion, and means for shutting off the less portion by each tank when it tilts.

4. A liquid weigher consisting of a pair of tilting tanks, the tanks being unbalanced and having means for emptying them when they are tilted, a valve casing having a pair of spouts, each to feed a tank, a ring in the casing to shut off part of each spout, a second ring to shut off the remainder of each spout, a weight to hold the first ring in its shut-off positions, floats in the tanks, means for actuating the first ring and its weight alternately by the floats, a rocking rod actuating the second ring, and arms on the rod and in the path of the tilting tanks.

5. A liquid weigher consisting of a pair of tilting tanks, the tanks being unbalanced and having means for emptying them when they are tilted, a valve casing having a pair of spouts, each to feed a tank, a ring in the casing to shut off part of each spout, a second ring to shut off the remainder of each spout, a weight to hold the first ring in its shut-off positions, floats in the tanks, a rod on the ring, arms on the rod, means for suspending the floats, arms on the suspending means and adapted to lift the arms on the rod, a rocking rod on the second ring, arms on the rocking rod, the last-mentioned arms extending in the paths of the tanks when they tilt.

6. A liquid weigher comprising independently operated tilting tanks which are tilted by fluid therein, a supply pipe having outlets arranged to supply the tanks with fluid, a valve in the pipe and adapted to control the direction of fluid to any of the outlets, and co-acting means on the tanks and the valve operated by the tilting of the tanks to shut off the flow of fluid from the tilted tank and direct it into an untilted tank.

7. A liquid weigher comprising a pair of tilting tanks, the tanks being unbalanced and having means for emptying them when they are tilted, a valve with outlets arranged to feed both tanks, and means on the tanks for operating the valve whereby the valve outlet of a tilted tank is shut off.

8. In combination, a pair of tanks, each tiltable by weight of fluid therein, a source of fluid supply, and means operable upon tilting of either tank to shut off the flow of fluid to such tank with substantial precision and to direct the fluid supply to the other tank.

9. In combination, a pair of tanks, each tiltable by weight of fluid therein, a fluid supply conduit, a three-way valve in said conduit having one outlet directed to each tank, and means operable by the tilting of either tank to actuate said valve to shut off the flow of fluid to such tank and to direct the flow to the other tank.

In testimony that I claim the foregoing I have hereunto set my hand this 22nd day of April, 1913.

WENZEL LEINERT.

Witnesses:
WM. H. CAMFIELD,
M. A. JOHNSON.